(12) United States Patent
Ichitani et al.

(10) Patent No.: US 9,023,234 B2
(45) Date of Patent: *May 5, 2015

(54) AQUEOUS HEAT TREATMENT LIQUID COMPOSITION

(75) Inventors: Katsumi Ichitani, Ichihara (JP); Fumiaki Takagi, Ichihara (JP); Masami Yamanaka, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/580,305

(22) PCT Filed: Feb. 22, 2011

(86) PCT No.: PCT/JP2011/053778
§ 371 (c)(1),
(2), (4) Date: Aug. 21, 2012

(87) PCT Pub. No.: WO2011/102523
PCT Pub. Date: Aug. 25, 2011

(65) Prior Publication Data
US 2013/0001461 A1 Jan. 3, 2013

(30) Foreign Application Priority Data

Feb. 22, 2010 (JP) ................................. 2010-035690

(51) Int. Cl.
*C09K 5/00* (2006.01)
*C21D 1/60* (2006.01)
(Continued)

(52) U.S. Cl.
CPC ............... *C21D 1/60* (2013.01); *C10M 173/02* (2013.01); *C10M 2207/123* (2013.01); *C10M 2209/103* (2013.01); *C10M 2209/104* (2013.01); *C10M 2209/105* (2013.01); *C10M 2215/221* (2013.01);
(Continued)

(58) Field of Classification Search
USPC .............................. 252/70, 71, 73, 79.1, 175
See application file for complete search history.

(56) References Cited

U.S. PATENT DOCUMENTS 3,902,929 A 9/1975 Meszaros
4,486,246 A 12/1984 Warchol
(Continued)

FOREIGN PATENT DOCUMENTS

CN 101067161 A 11/2007
JP 50-109106 8/1975
(Continued)

OTHER PUBLICATIONS

International Search Report issued May 17, 2011, in PCT/JP2011/053778.
(Continued)

*Primary Examiner* — Jane L Stanley
(74) *Attorney, Agent, or Firm* — Oblon, McClelland, Maier & Neustadt, L.L.P.

(57) ABSTRACT

An aqueous heat treatment liquid composition exhibiting a favorable rust resistance with a high cooling capability and a high uneven-cooling resistance is provided. The aqueous heat treatment liquid composition contains a hyperbranched polyglycerol. A mass average absolute molecular weight of the aqueous heat treatment liquid composition is preferably in a range of 5,000 to 500,000. When the aqueous heat treatment liquid composition is used for quenching of a metallic component, the aqueous heat treatment liquid composition can exhibit a favorable rust resistance with a high cooling capability and a high uneven-cooling resistance.

13 Claims, 5 Drawing Sheets

(51) Int. Cl.
*C10M 173/02* (2006.01)
*C08L 101/00* (2006.01)

(52) U.S. Cl.
CPC ..... *C10N 2220/021* (2013.01); *C10N 2220/022* (2013.01); *C10N 2220/028* (2013.01); *C10N 2230/12* (2013.01); *C10N 2240/402* (2013.01); *C10N 2240/404* (2013.01); C08L 101/005 (2013.01); *C10M 2201/081* (2013.01); *C10M 2207/022* (2013.01); *C10M 2207/046* (2013.01); *C10M 2209/1033* (2013.01)

(56) References Cited

U.S. PATENT DOCUMENTS

| | | | |
|---|---|---|---|
| 4,528,044 | A | 7/1985 | Warchol |
| 5,766,505 | A | 6/1998 | Kanamori et al. |
| 2009/0130006 | A1* | 5/2009 | Wang et al. ............... 423/111 |
| 2009/0309061 | A1* | 12/2009 | Seiler et al. ............... 252/70 |
| 2011/0162811 | A1* | 7/2011 | Furman et al. ............ 162/111 |
| 2012/0040877 | A1* | 2/2012 | Kakuchi et al. ........... 508/583 |

FOREIGN PATENT DOCUMENTS

| | | |
|---|---|---|
| JP | 60-501316 | 8/1985 |
| JP | 1-100217 | 4/1989 |
| JP | 9-227932 | 9/1997 |
| JP | 2002-265973 | 9/2002 |
| JP | 2009-185179 | 8/2009 |
| WO | WO 97/49781 A1 * 12/1997 | ............... C09K 5/04 |
| WO | WO 2010/103681 A1 * 9/2010 | ........... C10M 107/32 |

OTHER PUBLICATIONS

Owaku Shigeo, "Tenbou (Vision), Consideration of Quenching Crack", Heat Treatment, vol. 7, Issue No. 3, Jun. 1967, pp. 140-144.
Combined Office Action and Search Report issued Jun. 13, 2013 in Chinese Patent Application No. 201180010380.1 (with English translation and English translation of category of cited documents).

* cited by examiner

AQUEOUS HEAT TREATMENT LIQUID COMPOSITION

CROSS-REFERENCE TO RELATED APPLICATIONS

This application is a National Stage of PCT/JP2011/053778 filed on Feb. 22, 2011. This application is based upon and claims the benefit of priority to Japanese Application No. 2010-035690 filed on Feb. 22, 2010.

BACKGROUND OF THE INVENTION

Technical Field

The present invention relates to an aqueous heat treatment liquid composition used for quenching of a metallic component and the like.

BACKGROUND ART

A treatment liquid used for quenching of a metallic component is roughly classified into an oily heat treatment liquid and an aqueous (aqueous solution-type) heat treatment liquid. The oily heat treatment liquid is widely used. This is because the oily heat treatment liquid has an adequate cooling capability to reduce quenching distortion and avoid generation of quenching cracks.

On the other hand, the oily heat treatment liquid exhibits a slow cooling speed and an insufficient cooling capability to a particularly large metallic component and a poorly hardenable metallic component. Accordingly, the aqueous heat treatment liquid is used. However, since the aqueous heat treatment liquid exhibits a higher cooling capability than the oily heat treatment liquid, uneven cooling easily occurs, which may cause quenching cracks.

Accordingly, in order to prevent quenching cracks, a composition provided by adding a water-soluble polymer to an aqueous heat treatment liquid has been known. Such an aqueous heat treatment liquid composition inhibits heat transfer and suppresses cooling capability since the water-soluble polymer is attached to a surface of metallic component. The aqueous heat treatment liquid composition containing the water-soluble polymer has been industrially widespread, in which polyalkyleneglycol (PAG) is mainly used as the water-soluble polymer. However, the aqueous heat treatment liquid composition has a long steam-film stage, thereby easily causing uneven cooling.

In view of the above, an aqueous heat treatment liquid composition provided by adding glycol having a low molecular weight to polyalkylene glycol having a high molecular weight to shorten the steam film stage and improve uneven-cooling resistance has been proposed (see Patent Literature 1).

On the other hand, quenching using a solution of salt has been known for a long time as a technique of improving the uneven-cooling resistance. Since the solution of salt has no steam film stage, the solution of salt exhibits a high uneven-cooling resistance as well as a high cooling capability, thereby reducing quenching cracks (see Non-Patent Literature 1).

CITATION LIST

Patent Literature(s)

Patent Literature 1: JP-A-9-227932

Non-Patent Literature(s)

Non-Patent Literature 1: "Yaki-ware wo kangaeru (consideration of quenching cracks)" edited by Shigeo OWAKU, Heat Treatment, published in June in Showa 42-nen, the seventh volume, Issue No. 3, pp. 140-144

SUMMARY OF THE INVENTION

Problems to be Solved by the Invention

However, even the aqueous heat treatment liquid composition of Patent Literature 1 is not always sufficient in uneven-cooling resistance.

The solution of salt of Non-Patent Literature 1 generates rust in quite a short time of one hour or less after a heat treatment, resulting in a significant corrosion to equipment such as an oil bath. Accordingly, the solution of salt of Non-Patent Literature 1 is hardly usable for industrial purpose.

An object of the invention is to provide an aqueous heat treatment liquid composition exhibiting a favorable rust resistance with a high cooling capability and a high uneven-cooling resistance.

Means for Solving the Problems

In order to solve the above-mentioned problems, the invention provides the following aqueous heat treatment liquid composition:
(1) according to an aspect of the invention, an aqueous heat treatment liquid composition containing a hyperbranched polyglycerol;
(2) the aqueous heat treatment liquid composition in the above aspect (1), in which the hyperbranched polyglycerol has a mass average absolute molecular weight in a range of 5,000 to 500,000;
(3) the aqueous heat treatment liquid composition in the above aspect (2), in which the hyperbranched polyglycerol has a mass average absolute molecular weight in a range of 5,000 to 100,000;
(4) the aqueous heat treatment liquid composition in any one of the above aspect (1) to (3), in which the hyperbranched polyglycerol has a content in a range of 3 mass % to 30 mass % of a total amount of the composition;
(5) the aqueous heat treatment liquid composition according to any one of the above aspect (1) to (4), further containing a water-soluble rust inhibitor; and
(6) the aqueous heat treatment liquid composition according to any one of the above aspect (1) to (5), in which the aqueous heat treatment liquid composition is used for soaking/quenching, high-frequency quenching, or cooling at solution heat treatment.

Advantages of the Invention

Since the aqueous heat treatment liquid composition of the invention contains a hyperbranched polyglycerol, the aqueous heat treatment liquid composition exhibits a favorable rust resistance with a high cooling capability and a high uneven-cooling resistance.

DESCRIPTION OF EMBODIMENT(S)

An aqueous heat treatment liquid composition of the invention (hereinafter, occasionally abbreviated as "composition") is an aqueous solution containing a hyperbranched polyglycerol (hereinafter, occasionally abbreviated as "HBP-PGR").

For instance, HBP-PGR contained in the composition of the invention is a hyperbranched polyglycerol represented by the following formula (1) which is obtainable by ring-opening polymerization of glycidol. HBP-PGR has a branched structure in a repeating unit of glycidol.

[Formula 1]

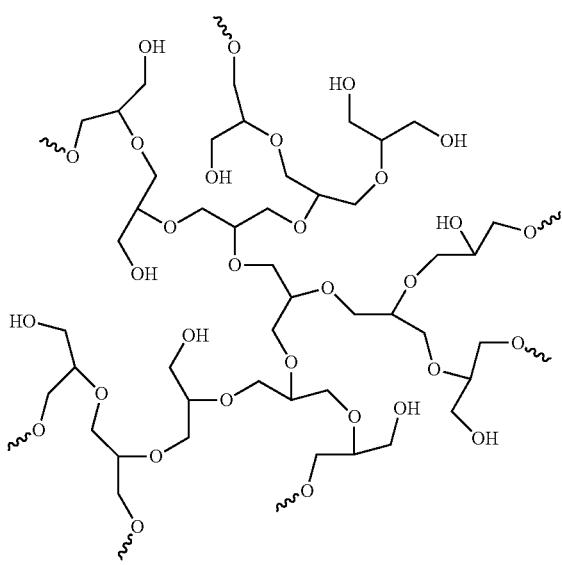

(1)

The composition containing HBP-PGR of the invention exhibits a favorable rust resistance with a high cooling capability and a high uneven-cooling resistance.

Figure 1:
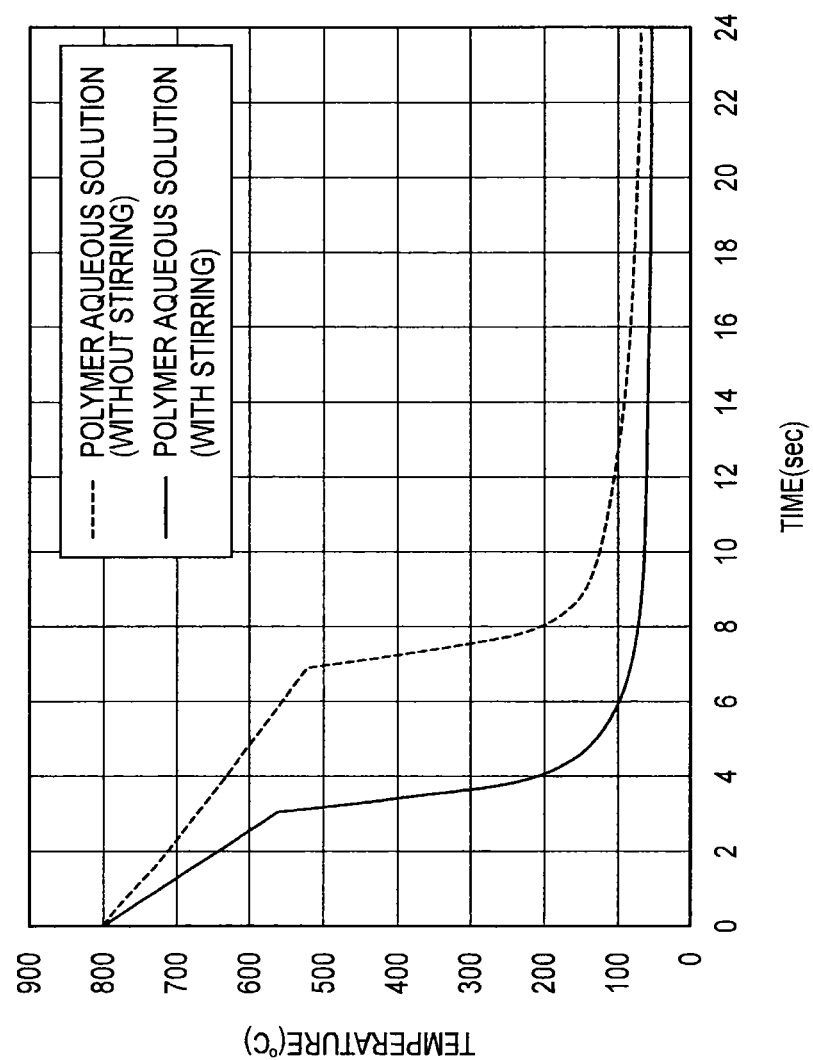
FIG. 1 illustrates cooling capability and uneven-cooling resistance of a conventional polymer aqueous solution.

For quenching using a conventional polymer aqueous solution, uneven cooling easily occurs since the conventional polymer aqueous solution has a long steam film stage. Accordingly, the polymer aqueous solution is stirred so as to suppress occurrence of uneven cooling. However, a stirring efficiency is partially lowered depending on a size and a shape of the metallic component. A cooling speed on a low stirring-efficient part relatively becomes slow, so that uneven cooling easily occurs. Herein, easiness of occurrence of uneven cooling can be evaluated in terms of a difference between a cooling time with stirring and a cooling time without stirring. In the conventional polymer aqueous solution, for instance, as shown in FIG. 1, it is found that uneven cooling easily occurs in view of a large difference in the cooling time.

Figure 2:
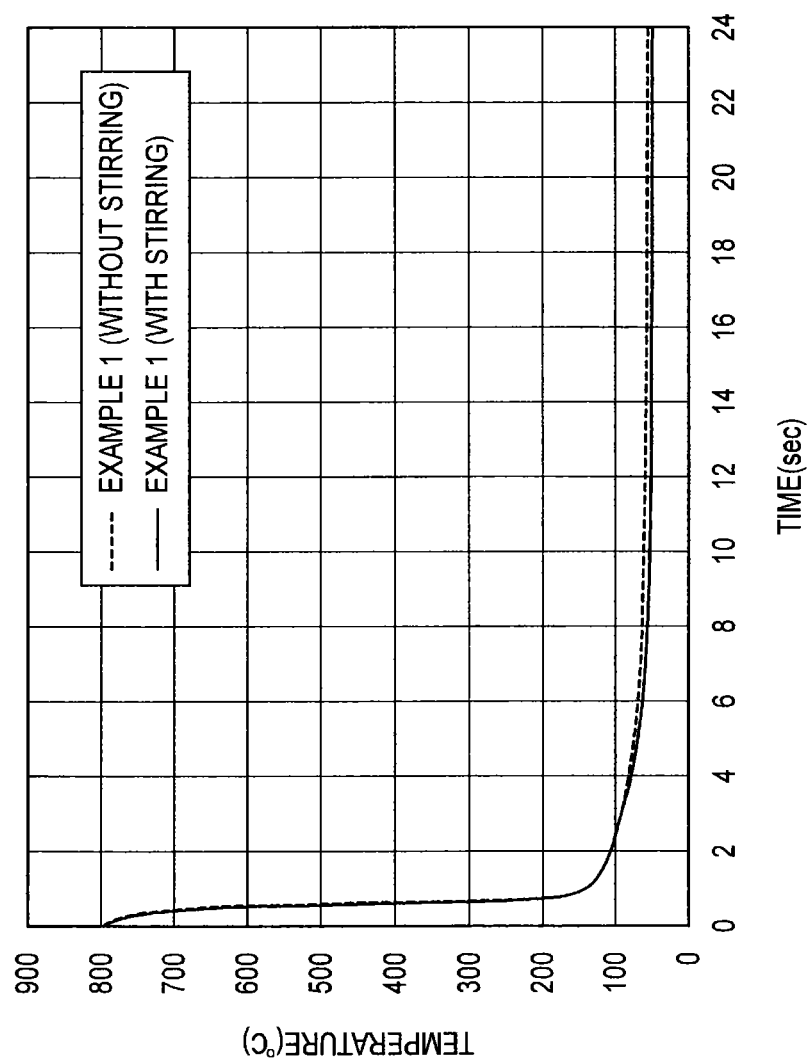
FIG. 2 illustrates cooling capability and uneven-cooling resistance of an aqueous heat treatment liquid composition according to the invention.

In contrast, in the composition of the invention, for instance, as shown in FIG. 2, since there is almost no steam film stage and almost no difference between the cooling time with stirring and the cooling time without stirring, the composition of the invention exhibits a high cooling speed to suppress occurrence of uneven cooling (specific experimental conditions are described later). Particularly, even for a large-sized metallic component or a complicated-shaped metallic component, the composition of the invention exhibits a high uneven-cooling resistance.

Moreover, unlike the conventional polymer aqueous solution, the composition of the invention does not form a polymer film on a surface of the metallic component, thereby exhibiting a higher cooling capability and a higher uneven-cooling resistance.

A blending content of HBP-PGR is preferably in a range of 3 mass % to 30 mass % of the total amount of the composition.

When the blending content of HBP-PGR is 3 mass % or more, the composition can exhibit a sufficient uneven-cooling resistance. On the other hand, when the blending content of HBP-PGR is 30 mass % or less, a viscosity of the composition is prevented from being increased, so that a cleaning step of a sticky metallic component is not required.

Accordingly, the blending content of HBP-PGR is preferably in a range of 5 mass % to 15 mass %.

A mass average absolute molecular weight of HBP-PGR is preferably in a range of 5,000 to 500,000.

When the mass average absolute molecular weight of HBP-PGR is 5,000 or more, the composition can exhibit a favorable viscosity to exhibit sufficient cooling capability and uneven-cooling resistance. When the mass average absolute molecular weight of HBP-PGR is 500,000 or less, a polymer chain is unlikely to be cut and formation of low molecules can be restrained, so that the composition can exhibit sufficient cooling capability and uneven-cooling resistance.

Accordingly, the mass average absolute molecular weight of HBP-PGR is preferably in a range of 5,000 to 100,000.

It should be noted that the mass average absolute molecular weight of HBP-PGR can be measured using an NaNO$_3$ aqueous solution of a 0.2-mol/L concentration as a mobile phase solvent according to the size-exclusion chromatography on-line to multi-angle light-scattering (SEC-MALLS) method.

HBP-PGR has a degree of branching in a range of 0.40 to 0.65, preferably of 0.45 to 0.55. The degree of branching in HBP-PGR can be measured according to the following method.

Measuring Method of Degree of Branching

Measurement Conditions: 200 mg of a polymer is dissolved in 0.6 mL of heavy water.

Used Apparatus: 100 MHz$^{13}$C-NMR manufactured by JEOL Ltd., "JEOLJNM-A400II"

Measurement Conditions: Inversion gate-coupled $^{13}$C-NMR measurement (nne$^{13}$C-NMR), in which the pulse interval time is seven seconds and acetone is for the standard peak (δ: 30.89 ppm).

Integration Frequency: 4000 times

Peak Range for Integration

L1: 60.75-62.12 ppm

T: 62.68-63.35 ppm

L2: 72.01-73.38 ppm (The integrated value of the peak contains fragments of two carbons and this is divided into half in computation.)

D: 76.93-79.68 ppm

Figure 3:
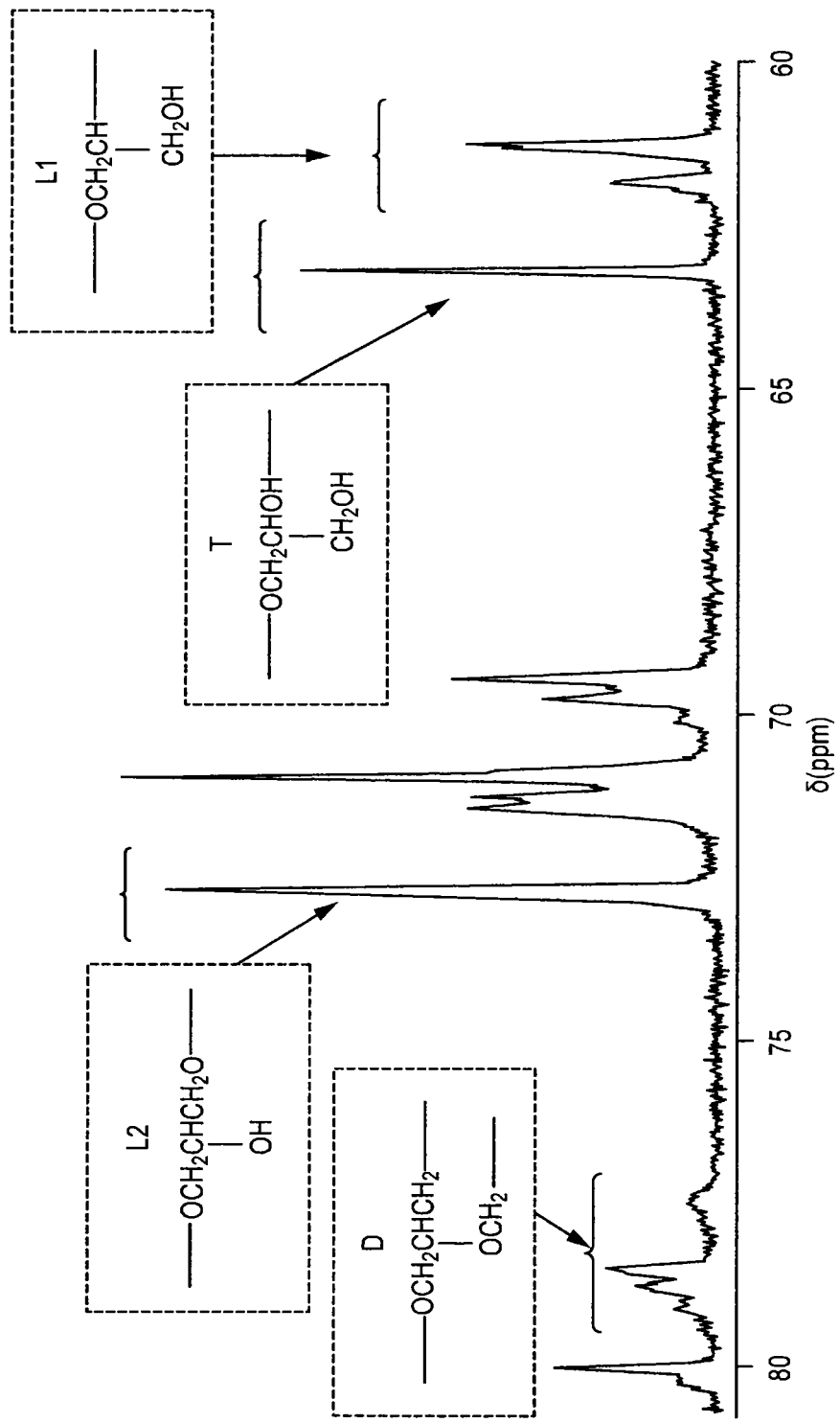
FIG. 3 illustrates $^{13}$C-NMR spectra so as to calculate a degree of branching in a hyperbranched polyglycerol used in the invention.

The peak ranges are shown in the $^{13}$C-NMR spectra in FIG. 3.

The degree of branching (DB) is computed from the integrated values of the peaks according to the following formula (2):

$$\text{Degree of Branching(DB)} = 2D/(2D+L1+L2/2) \quad (2)$$

Manufacturing Method of HBP-PG

A manufacturing method of HBP-PGR includes ring-opening polymerization of glycidol (a monomer) with a $BF_3$ complex as an initiator. Examples of the $BF_3$ complex as the initiator include a $BF_3$-ethylether complex [$(C_2H_5)_2O.BF_3$], a $BF_3$-phenol complex [$(C_6H_5OH)_2.BF_3$], a $BF_3$-monoethylamine complex [$C_2H_5NH_2.BF_3$], and a $BF_3$-n-butylether complex [$(n-C_4H_9)_2O.BF_3$]. Among the above, the $BF_3$-ethylether complex is preferable in terms of the performance as the initiator.

The solvent in the ring-opening polymerization may be an organic solvent inert to the reaction and capable of fully dissolving the initiator, the monomer glycidol and the resulting HBP-PGR, and the methylene chloride is especially preferable.

A preferred example of specific operation is described. Methylene chloride serving as the solvent and a $BF_3$-ethylether complex serving as the initiator are put into a reactor equipped with a stirrer and a glycidol supply unit. With stirring the initiator-containing solution, glycidol is gradually put into the reactor. The supplied amount of the $BF_3$-ethylether complex is in a range of 1 mmol to 10 mmol, preferably of 2 mmol to 6 mmol per liter of the solvent.

The glycidol supply speed is in a range of 0.05 mol/h to 1.0 mol/h, preferably of 0.1 mol/h to 0.5 mol/h per liter of the solvent. The polymerization temperature is preferably in a range of −30 degrees C. to 10 degrees C., more preferably of −20 degrees C. to 0 degree C.

The total supplied amount of glycidol may be in a range of 300 mol to 1,800 mol, preferably of 400 mol to 1,600 mol, per mol of the $BF_3$-ethylether complex in terms of the yield of HBP-PGR.

Stirring conditions may be optimized depending on the size of the reactor and the shape of the stirrer. After supply of glycidol, the mixture is further stirred at the polymerization temperature to continue the polymerization. The total polymerization time cannot be defined unambiguously, as depending on the polymerization temperature and the supplied amounts of the initiator and glycidol, but may be generally from 20 hours to 50 hours.

The ring-opening polymerization is attained in the manner as the above and the conditions are suitably selected, whereby the mass average absolute molecular weight of HBP-PGR can be controlled and, in addition, HBP-PGR can be produced with a good reproducibility.

In the ring-opening polymerization, intramolecular cyclization (backbiting) may easily occur under the condition where the amount of the monomer is small in the reaction system. Accordingly, when the glycidol supply speed is too low or when the polymerization time is too long, the intramolecular cyclization easily occurs, which may cause to lower the molecular weight of the produced polymer or lower the yield thereof.

After the reaction, HBP-PGR produced through the ring-opening polymerization may be collected efficiently, for example, according to the following operation.

After the reaction is stopped with aqueous ammonia or the like, the solvent is distilled away, and then the residue is dissolved in methanol and reprecipitated in acetone, whereby highly purified HBP-PGR can be obtained.

The composition of the invention preferably contains a water-soluble rust inhibitor. In view of improvement in rust resistance and economical balance, a content of the water-soluble rust inhibitor is preferably in a range of 0.01 mass % to 5 mass % of the total amount of the composition, more preferably of 0.03 mass % to 1 mass %.

Examples of the water-soluble rust inhibitor include aliphatic monocarboxylates such as octanate and nonanoate, aliphatic branched carboxylates such as isononanoate and neodecanoate, and aliphatic dicarboxylates such as octanedioic acid salt (suberate), decanedioic acid salt (sebacate) and dodecanedioic acid, among which potassium sebacate, dodecanedioic acid ethanol amine salt and the like are preferably used. Aromatic carboxylates may be used as the water-soluble rust inhibitor.

A piperazine derivative such as monohydroxy monoethyl piperazine may also be preferably used as the water-soluble rust inhibitor.

The composition of the invention may also contain an additive generally used in the heat treatment liquid, such as an antioxidant and a detergent dispersant.

Since the composition of the invention can exhibit excellent cooling capability, uneven-cooling resistance and rust resistance in the heat treatment of the metallic component, the composition of the invention is suitably usable as a heat treatment liquid for various alloy steel such as carbon steel, nickel-manganese steel, chrome-molybdenum steel and manganese steel.

For the heat treatment of the metallic component (e.g., a steel material) using the composition of the invention, the temperature of the composition (i.e., the heat treatment liquid) is set at a typical temperature for the heat treatment (i.e., about 40 degrees C.). When the cooling capability of the composition is controlled, the temperature of the composition may be set as high as possible at 100 degrees or less.

Since the composition of the invention exhibits rust resistance with high cooling capability and uneven-cooling resistance, the composition of the invention is suitably usable as a heat treatment liquid used for soaking/quenching, high-frequency quenching, cooling of aluminum and the like at solution heat treatment, and the like.

EXAMPLES

Now, the invention will be further described in detail with reference to Examples and Comparatives, which by no means limit the invention. Specifically, the aqueous heat treatment liquid composition was evaluated in terms of cooling capability, uneven-cooling resistance and rust resistance in the following method.

Examples 1, 2 and Comparatives 1 to 5

A predetermined amount of each of the following additives was blended in water to prepare an aqueous heat treatment liquid composition as a sample liquid. Blend compositions are shown in Table 1.
(1) Additive
(1.1) Heat-Treating Agent
hyperbranched polyglycerol (HBP-PGR): mass average absolute molecular weight (Mw)=10,000, molecular weight dispersion (Mw/Mn)=3.08, degree of branching (BD)=0.51
polyalkyleneglycol (PAG): mass average absolute molecular weight (Mw)=40,000
ethylene glycol monobutyl ether and propylene glycol: commercially available products
(1.2) Water-Soluble Rust Inhibitor
potassium sebacate and monohydroxy monoethyl piperazine: commercially available products (1.3) Salt: commercially available product (2) Measurement of Mass Average Absolute Molecular Weight (Mw)

The mass average absolute molecular weight of each of HBP-PGR and PAG was measured according to the size-exclusion chromatography on-line to multi-angle light-scattering (SEC-MALLS) method using the following apparatus under the following conditions. Polystyrene was used as the standard sample.

Separation column: Two Tosoh TSKgel GMPW$_a$, columns (linear, 7.5 mm×600 mm; exclusion limit, 5×10$^7$) were used.

Column Temperature: 40 degrees C.

Mobile phase solvent: NaNO$_3$ aqueous solution having a 0.2 mol/L concentration Mobile phase flow rate: 1.0 mL/min Sample concentration: 3 g/mL Injected amount: 100 μL Detector 1: Multiangle light scattering detector (manufactured by Wyatt Technology Corporation: "DAWN 8")

Detector 2: Viscosity detector (manufactured by Wyatt Technology Corporation: "Viscostar")

Detector 3: Refractive index (RI) detector (manufactured by Wyatt Technology Corporation: "Optilab rEX")

(3) Measurement of Average Molecular Weight Distribution (Mass Average Absolute Molecular Weight (Mw)/Number Average Molecular Weight (Mn), Mw and Mn being Standard Polystyrene-Equivalent Value)

Measurement was made according to the SEC-MALLS method using the apparatus and under the conditions of the above (2)

(4) Measurement of Degree of Branching (DB)

Measurement was made according to the method described herein.

Evaluation Method

Each of the sample liquids was evaluated in terms of cooling capability, uneven-cooling resistance and rust resistance in the following method.

Cooling Capability

Cooling capability was evaluated according to the cooling capability measurement method of JIS K 2242. Specifically, a time elapsed for cooling a casting from 800 degrees C. to 150 degrees C. was measured without stirring a sample liquid having a liquid temperature of 40 degrees C. Cooling capability was evaluated in terms of the cooling time.

Uneven-Cooling Resistance

Uneven-cooling resistance was evaluated in terms of a difference of an elapsed time for cooling the casting from 800 degrees C. to 150 degrees C. with stirring the sample liquid having the liquid temperature of 40 degrees C. at a flow rate of 10 cm/c relative to the elapsed time for cooling a casting from 800 degrees C. to 150 degrees C. without stirring the sample liquid having a liquid temperature of 40 degrees C.

Rust Resistance

Rust resistance was evaluated according to DIN 51360-12-A. Specifically, 2 g of chips of the casting was put on a filter paper in a petri dish, into which 2 ml of the sample liquid was dripped and left for two hours. Subsequently, rust situations were evaluated. Rust resistance is represented by five scales described below.

0: no rust

1: mark of rust (generation of three or less dot-like pieces of rust)

2: slight rust (generation of four or more dot-like pieces of rust)

3: rust in a medium level (generation of dot-like pieces of rust on the substantially entire casting)

4: rust in a severe level (generation of dot-like pieces of rust on the entire casting)

Evaluation Results

Figure 4:
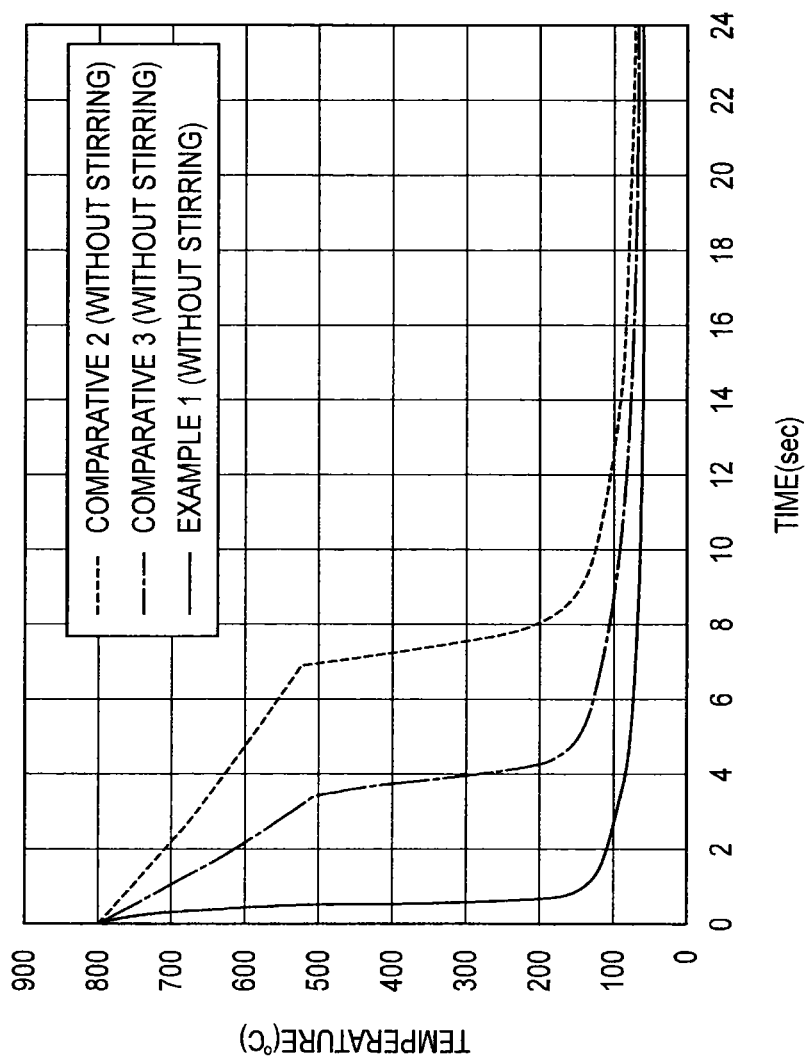
FIG. 4 illustrates cooling capability of the aqueous heat treatment liquid composition according to Examples and Comparatives of the invention.
Figure 5:
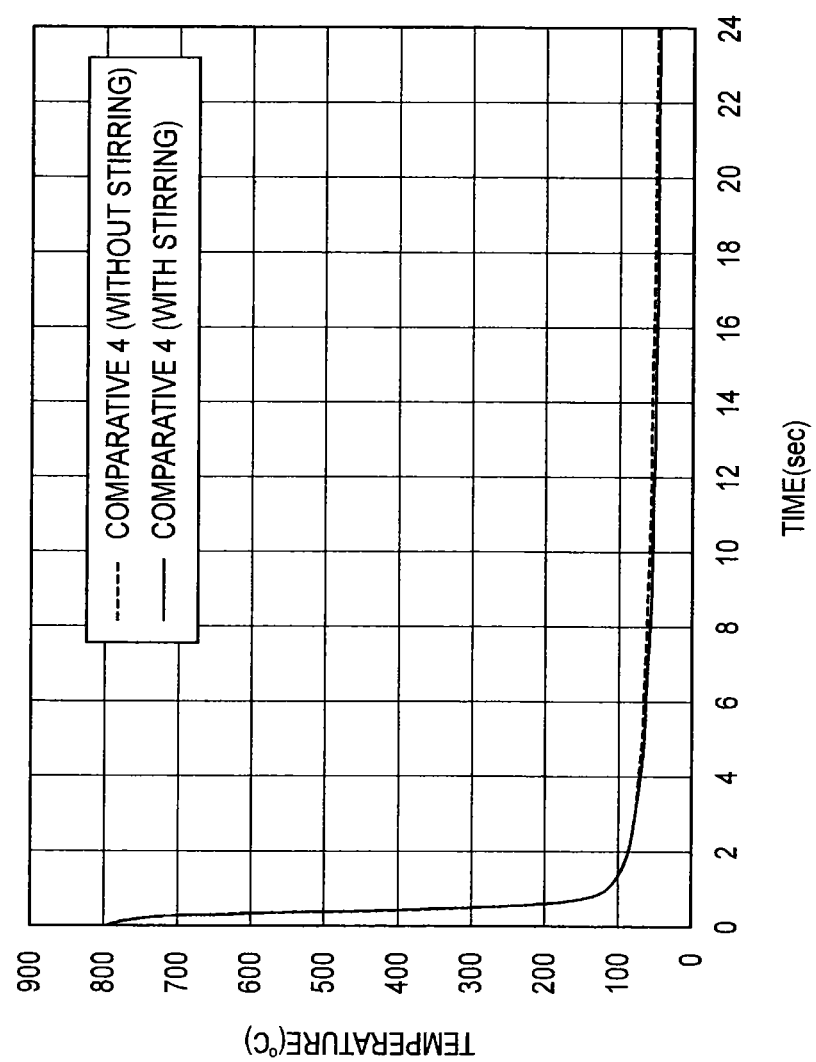
FIG. 5 illustrates cooling capability and uneven-cooling resistance of a solution of salt in Comparatives.

As shown in Table 1 and FIGS. 2, 4 and 5, the cooling time by the sample liquids containing HBP-PGR of Examples 1 and 2 is 1.0 second. It is understood that the sample liquids of Examples 1 and 2 have the similar cooling capability to that of the sample liquids (solutions of salt) of Comparatives 4 and 5. On the other hand, the cooling time by the sample liquids containing PAG of Comparatives 1 to 3 ranges from 7.8 seconds to 10.5 seconds. It is understood that the cooling speed is slow and the cooling capability is low.

TABLE 1

|  |  |  | Ex. 1 | Ex. 2 | Comp. 1 | Comp. 2 | Comp. 3 | Comp. 4 | Comp. 5 |
|---|---|---|---|---|---|---|---|---|---|
| Blend Composition (mass %) | heat-treating agent | hyperbranched polyglycerol (HBP-PGR)(Mw = 10,000) | 5 | 5 | — | — | — | — | — |
|  |  | polyalkyleneglycol (PAG)(Mw = 40,000) | — | — | 5 | 8 | 8 | — | — |
|  |  | ethylene glycol monobuthyl ether | — | — | — | — | 0.6 | — | — |
|  |  | propylene glycol | — | — | — | — | 1 | — | — |
|  | rust inhibitor | potassium sebacate | — | 0.6 | — | 0.6 | 0.6 | — | 0.6 |
|  |  | monohydroxy monoethyl piperazine | — | 0.4 | — | 0.4 | 0.4 | — | 0.4 |
|  | salt |  | — | — | — | — | — | 5 | 5 |
|  | tap water |  | 95 | 94 | 95 | 91 | 89.4 | 95 | 94 |
| Evaluation Result | cooling capability 800 to 150° C.-cooling time (sec) |  | 1.0 | 1.0 | 8.9 | 10.5 | 7.8 | 0.8 | 0.8 |
|  | uneven-cooling resistance difference (sec) in cooling time w/wo stirring |  | 0.02 | 0.03 | 3.0 | 2.6 | 0.7 | 0.02 | 0.02 |
|  | rust resistance situation of rust generation 2 hrs later |  | 2 | 0 | 2 | 0 | 0 | 4 | 4 |

As shown in Table 1 and FIGS. 2 and 5, a difference in the cooling time between the sample liquids of Examples 1 and 2 is 0.02 second or 0.03 second. It is understood that the sample liquids of Examples 1 and 2 have uneven-cooling resistance similar to that of the solutions of salt in Comparatives 4 and 5. On the other hand, a difference in the cooling time between the sample liquids containing PAG and the like of Comparatives 1 to 3 ranges from 0.7 seconds to 3.0 seconds. It is understood that uneven cooling easily occurs.

Moreover, it is understood that the sample liquid of Example 1 has rust resistance enough for practical use and the sample liquid containing the water-soluble rust inhibitor of Example 2 exhibits a further improved rust resistance. In other words, it is understood that the rust resistance can be freely set. It is understood that the sample liquids of Examples 1 and 2 exhibit rust resistance similar to that of the sample liquids containing PAG and the like of Comparatives 1 to 3. On the other hand, it is understood that the solution of salt containing the water-soluble rust inhibitor in Comparative 5 exhibits almost the same rust resistance as the solution of salt containing no water-soluble rust inhibitor in Comparative 4.

It can be understood from the above results that the aqueous heat treatment liquid composition of the invention can exhibit a favorable rust resistance with a high cooling capability and a high uneven-cooling resistance when used for quenching.

The invention claimed is:

1. An aqueous heat treatment liquid composition, comprising:
    a hyperbranched polyglycerol in a content ranging from greater than 5 mass % to 30 mass % or less of a total amount of the composition;
    at least one water-soluble rust inhibitor comprising a piperazine derivative; and
    at least one additional water-soluble rust inhibitor selected from the group consisting of an aliphatic monocarboxylate, an aliphatic dicarboxylate, and an aromatic carboxylate.

2. The composition according to claim 1, wherein the hyperbranched polyglycerol has a mass average absolute molecular weight in a range of 5,000 to 500,000.

3. The composition according to claim 2, wherein the hyperbranched polyglycerol has a mass average absolute molecular weight in a range of 5,000 to 100,000.

4. The composition according to claim 3, comprising the hyperbranched polyglycerol with a content in a range of greater than 5 mass % to 15 mass % of a total amount of the composition.

5. The composition according to claim 3, which contains the aliphatic dicarboxylate.

6. The composition according to claim 2, comprising the hyperbranched polyglycerol with a content in a range of greater than 5 mass % to 15 mass % of a total amount of the composition.

7. The composition according to claim 2, which contains the aliphatic dicarboxylate.

8. The composition according to claim 1, comprising the hyperbranched polyglycerol with a content in a range of greater than 5 mass % to 15 mass % of a total amount of the composition.

9. The composition according to claim 8, which contains the aliphatic dicarboxylate.

10. The composition according to claim 1, which contains the aliphatic dicarboxylate.

11. The composition according to claim 1, wherein the aqueous heat treatment liquid composition is a cooling composition for soaking and quenching, high-frequency quenching, or solution heat treatment.

12. The composition according to claim 1, which contains the aliphatic monocarboxylate.

13. The composition according to claim 1, which contains the aromatic carboxylate.

* * * * *